United States Patent [19]

Luz

[11] 4,377,776

[45] Mar. 22, 1983

[54] DUTY-CYCLE CONTROLLED INVERTER POWER SUPPLY FOR A TELEVISION RECEIVER

[75] Inventor: David W. Luz, Indianapolis, Ind.

[73] Assignee: RCA Corporation, New York, N.Y.

[21] Appl. No.: 288,237

[22] Filed: Jul. 29, 1981

[51] Int. Cl.³ .............................................. H01J 29/70
[52] U.S. Cl. .................................................... 315/411
[58] Field of Search ................ 315/411; 358/190, 243; 363/22, 24

[56] References Cited

U.S. PATENT DOCUMENTS

| | | | |
|---|---|---|---|
| 2,896,146 | 7/1959 | Jenkins . | |
| 3,967,182 | 6/1976 | Scott | 321/18 |
| 4,103,356 | 7/1978 | Finlay | 363/22 |
| 4,176,304 | 11/1979 | Scott | 315/411 |
| 4,237,403 | 12/1980 | Davis | 315/98 |
| 4,240,013 | 12/1980 | Wedam | 315/411 |
| 4,319,315 | 3/1982 | Keeney et al. | 363/22 |

FOREIGN PATENT DOCUMENTS 1421797  1/1976  United Kingdom .
2041668  9/1980  United Kingdom .

Primary Examiner—Theodore M. Blum
Attorney, Agent, or Firm—E. M. Whitacre; P. J. Rasmussen; Joseph Laks

[57] ABSTRACT

In an inverter power supply, the main current paths of first and second transistors are coupled in a push-pull arrangement to a source of direct voltage and to the primary winding of a power transformer. The on-off switching of the conduction in the main current paths develops an alternating polarity voltage across the primary winding to develop a supply voltage across a secondary winding of the power transformer. A control circuit for the two transistors produces the on-off switching at a nominal fifty percent duty cycle. A signal representative of the current in the main paths of the two transistors is developed. In response to this signal, the duty cycle of the on-off switching is adjusted so as to oppose changes in the amplitude of the current in the main current paths and so as to oppose changes in the duty-cycle switching away from the nominal fifty percent.

18 Claims, 7 Drawing Figures

DUTY-CYCLE CONTROLLED INVERTER POWER SUPPLY FOR A TELEVISION RECEIVER

This invention relates to push-pull inverter power supply circuitry with duty cycle control useful as a television receiver power supply.

The power supply of the television receiver generates various direct voltages including a B+ voltage that energizes a deflection generator. To obtain relatively high efficiency and to reduce the bulk and weight of the power supply, a switching inverter operated at a high frequency may be used to excite a relatively compact power transformer. In some inverter power supplies, the power transformer may also include a high voltage winding used to develop the ultor accelerating potential of the television receiver picture tube.

To regulate the output voltages developed across the power transformer secondary windings, U.S. patent application Ser. No. 144,150, filed Apr. 28, 1980, by F. S. Wendt, entitled "HIGH FREQUENCY FERRO-RESONANT POWER SUPPLY FOR A DEFLECTION AND HIGH VOLTAGE CIRCUIT," describes the use of a ferroresonant transformer as the power transformer of a television receiver high frequency inverter power supply. The ferroresonant power transformer is designed to incorporate a relatively large leakage inductance between the primary winding and each of the output secondary windings to enable regulated output voltages to be developed across the secondary windings while the voltage across the primary winding is unregulated.

In U.S. patent application Ser. No. 220,847, filed Dec. 29, 1980, by D. H. Willis, entitled "TELEVISION RECEIVER FERRORESONANT LOAD POWER SUPPLY," a ferroresonant saturable reactor arrangement is coupled across a secondary winding of a high leakage power transformer. The ferroresonant saturable reactor regulates the voltage across one power transformer secondary winding, thereby regulating the voltages across all other magnetically tightly coupled secondary windings of the power transformer.

Because of the relatively large leakage inductances that exist between the primary winding and the secondary windings of the power transformers described in the above two U.S. patent applications, an advantageous design of the inverter portion of the power supply may be that of a push-pull switching arrangement coupled to the primary winding of the power transformer. Two switching transistors are coupled to the power transformer primary winding and to a source of direct current voltage in such a manner that the alternate switching of the transistors produces a square-wave alternating polarity voltage across the power transformer primary winding. The control circuitry for the two switching transistors nominally produces a 50 percent duty cycle switching of the two transistors. With a 50 percent duty cycle switching, no undesirable, net DC magnetic flux is introduced into the core of the inverter power transformer.

Should one of the transistors conduct for a longer interval than the other, forward collector current in the longer conducting transistor may be substantially greater than that in the other transistor, producing a net DC flux in the power transformer core and reducing the forward collector current in the shorter conducting transistor to the point where proper inverter operation may be disrupted.

A feature of the invention is an inverter control circuit with feedback that produces near 50 percent duty cycle switching of the inverter. A controllable switch has a main current path coupled to a source of direct current voltage and to a primary winding of a power transformer. On-off switching of the conduction in the main current path develops an alternating polarity voltage across the primary winding, thereby developing a supply voltage across a supply winding of the transformer. A control circuit coupled to the switch produces the on-off switching of the conduction in the main path. A signal representative of the current in the main path is developed and is applied to the control circuit to adjust the duty cycle of the on-off switching so as to oppose changes in the amplitude of the current in the main path. For a control circuit that nominally produces a 50 percent duty cycle on-off switching, opposition to the changes in the amplitude of the current in the main path of the switch results in opposition to the changes in the on-off duty cycle switching away from the nominal 50 percent duty cycle.

In U.S. patent application Ser. No. 174,943, filed Aug. 4, 1980, by D. W. Luz and D. H. Willis, entitled "TELEVISION RECEIVER, PUSH-PULL INVERTER, FERRORESONANT TRANSFORMER POWER SUPPLY SYNCHRONIZED WITH HORIZONTAL DEFLECTION," there is described a push-pull inverter for a television receiver ferroresonant power supply wherein the inverter is operated synchronously with deflection circuit scanning. The control circuit of the inverter includes a feedback winding of the power transformer for providing forward drive to the inverter switching transistors. Horizontal deflection current flows in the primary winding of a synchronizing pulse transformer. The deflection current produces the magnetic saturation of the magnetizable core of the synchronizing pulse transformer during the entire deflection cycle except during those intervals that encompass the zero-crossover instants of the deflection current. Near the zero-crossover instants, the pulse transformer core comes out of saturation, thereby developing output voltages across secondary windings of the transformer. The output voltages are then applied to the inverter control circuit so as to alternately turn off the two switching transistors, one during the trace interval of each deflection cycle, the other during the retrace interval.

If switching characteristics, such as storage time and turn-off delay, of the two transistors vary from unit to unit, then the exact instant, near the deflection current zero-crossover instant, when collector conduction of a switching transistor ceases will also vary from unit to unit. Such variations in the cutoff of collector current produces an undesirable variation in the duty cycle of the inverter square-wave voltage. Another feature of the invention is a control circuit that adjusts the moment when forward base current of the switching transistor is diverted away from the base to initiate the turning off of the transistor. The moment that corresponding collector conduction stops is thereby adjusted so as to maintain a 50 percent duty cycle inverter square-wave voltage.

Figure 1:
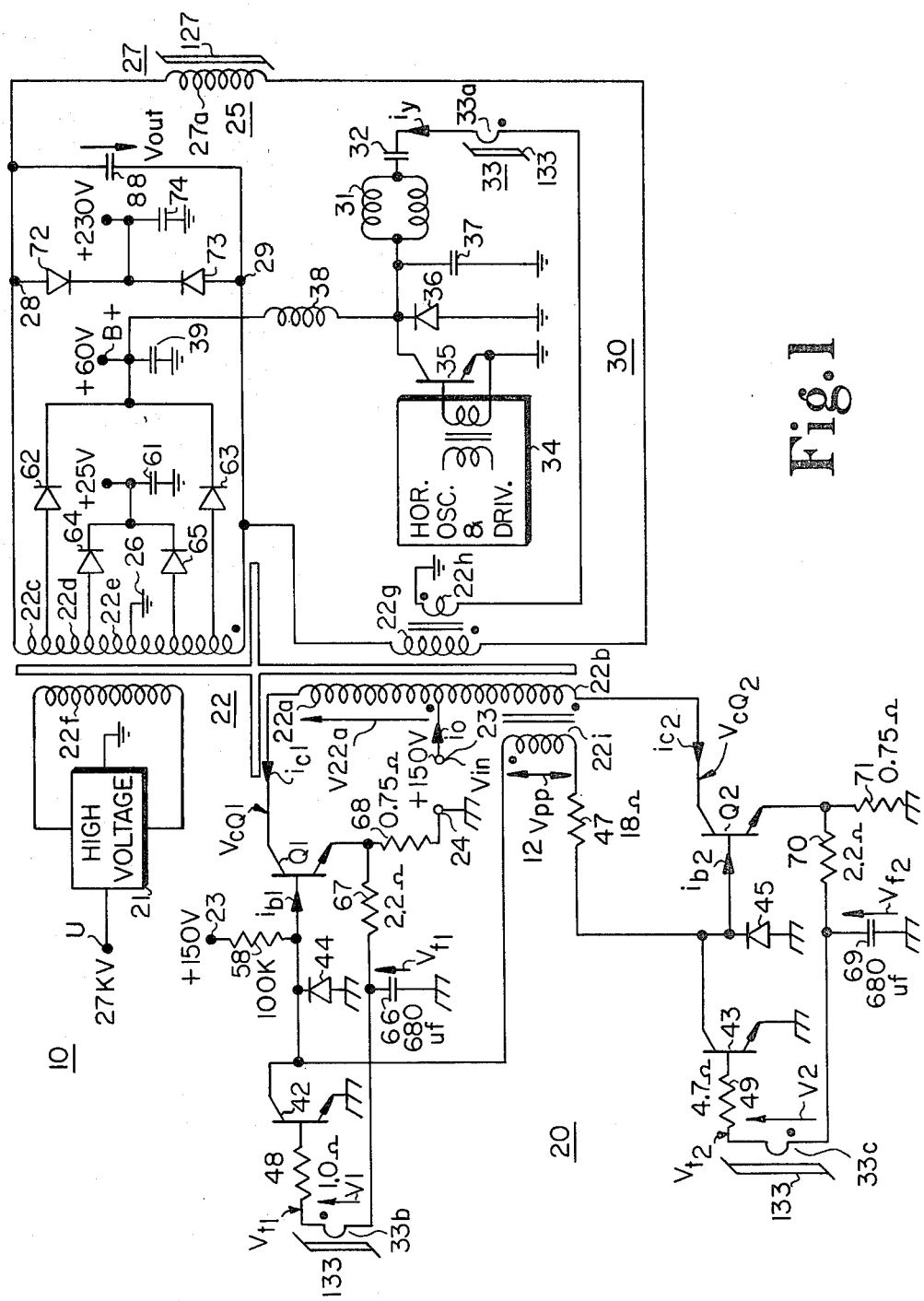
FIG. 1 illustrates a deflection synchronized inverter power supply for a television receiver including inverter control circuitry embodying the invention.

In FIG. 1, a power supply 10 for a television receiver comprises an inverter 20 and a high leakage inductance power transformer 22. A source of unregulated direct voltage develops a DC input voltage, of illustratively +150 volts, between an input terminal 23 and an earth ground terminal 24. The primary winding of power transformer 22 comprises two winding sections 22a and 22b connected together at a center tap terminal that is coupled to DC input terminal 23. Output switching transistors Q1 and Q2 of inverter 20 have collector electrodes coupled to end terminals of primary winding sections 22a and 22b, respectively, so as to form a push-pull arrangement. The emitter electrodes of transistors Q1 and Q2 are coupled to earth ground through current sensing resistors 68 and 71, respectively.

The control circuit of inverter 20 produces on-off switching of transistors Q1 and Q2 so as to produce alternate conduction in the collector-to-emitter main current paths of the transistors. The on-off switching of transistors Q1 and Q2 develops a rectangular wave alternating polarity voltage across each of the primary winding sections 22a and 22b of power transformer 22, with the voltage across primary winding section 22a being 180° out of phase to the voltage across primary winding section 22b. The alternating polarity rectangular wave voltage developed across each of the primary winding sections produces an alternating polarity supply voltage of the same frequency across each of secondary output supply windings 22c–22f of power transformer 22. Secondary windings 22c–22e have a common chassis ground center tap 26, isolated from earth ground 24.

The alternating polarity output voltage developed across winding 22c is full-wave rectified by diodes 72 and 73 and filtered by a capacitor 74 to develop a DC supply voltage, of illustratively +230 volts, to power such circuits as the television receiver picture tube driver circuits. The alternating polarity output voltage developed across winding 22e is full-wave rectified by diodes 64 and 65 and filtered by a capacitor 61 to develop a DC supply voltage, of illustratively +25 volts, to power such television receiver circuits as the vertical deflection circuit, the audio circuit, and the chroma-luma circuits.

The alternating polarity output voltage developed across winding 22d is full-wave rectified by diodes 62 and 63 and filtered by a capacitor 39 to develop, at a B+ terminal, a B+ scan supply voltage to energize a horizontal deflection generator circuit 30 for developing horizontal scanning current in a horizontal deflection winding 31. Horizontal deflection circuit 30 is coupled to the B+ terminal through an inductor 38 and comprises a horizontal oscillator and driver 34, a horizontal output transistor 35, a damper diode 36, a retrace capacitor 37, and the series arrangement of horizontal deflection winding 31, an S-shaping or trace capacitor 32, a winding 33a of a saturable pulse transformer 33 and a winding 22h of power transformer 22. Saturable pulse transformer 33 provides synchronizing pulses that establish the frequency of operation of inverter 20 at the horizontal deflection frequency and that synchronizes inverter operation with the horizontal deflection or scanning current, as will be later described.

The alternating polarity output voltage developed across a high voltage winding, secondary output winding 22f, is coupled to a high voltage circuit 21 to develop a DC ultor voltage or accelerating potential at a terminal U for the television receiver picture tube, not illustrated. High voltage circuit 21 may comprise a conventional voltage multiplier circuit of the Cockroft-Walton type, or may comprise a half-wave rectifier arrangement with a plurality of diodes integrally molded as a single unit with a plurality of winding sections of winding 22f, the sections not being individually illustrated.

The output voltage Vout developed across secondary output winding 22c, between terminals 28 and 29, is regulated by the ferroresonant operation of a ferroresonant load circuit 25, as described in the aforementioned Willis U.S. patent application and in U.S. patent application Ser. No. 255,396, filed Apr. 20, 1981, by D. H. Willis, entitled "TELEVISION RECEIVER FERRO-RESONANT LOAD POWER SUPPLY WITH REDUCED SATURABLE REACTOR CIRCULATING CURRENT," both applications herein incorporated by reference. Ferroresonant load circuit 25 comprises a saturable reactor 27 including a magnetizable core 127 and a winding 27a located thereon, a capacitor 88 coupled between terminals 28 and 29 and a winding 22g of transformer 22 magnetically tightly coupled to winding 22a and conductively coupled in series with saturable reactor winding 27a across capacitor 88.

By being coupled to transformer secondary output winding 22c, ferroresonant load circuit 25 acts as a regulating load circuit to maintain the voltage across winding 22c as the regulated voltage Vout. With the voltage across secondary output winding 22c regulated by the ferroresonant operation of ferroresonant load circuit 25, the output voltages across all the other secondary windings that are tightly coupled to winding 22c, including high voltage winding 22f, are also regulated. Because of the loose magnetic coupling between each of the primary winding sections 22a and 22b, and each of the secondary windings 22c–22f, the voltage across the secondary windings can remain relatively unchanged in amplitude or half-cycle area, even though the voltages across the primary winding sections vary in amplitude.

Transformer 22, in combination with capacitor 88, develops an exciting current in saturable reactor winding 27a for generating a combined magnetic flux in core 127 that links winding 27a to produce the alternating polarity output voltage Vout. To regulate Vout by ferroresonant operation, capacitor 88 generates a circulating current during each half cycle of the alternating polarity output voltage that aids in magnetically saturating the core section of magnetizable core 127 that is associated with the reactor winding.

As the saturable core section goes into saturation and comes out of saturation, the inductance exhibited by saturable reactor winding 27a switches between a low inductance and a high inductance. Under control of this switching action, which is a function of the saturation characteristics of the magnetizable material of core 127, the amplitude of the output voltage, the half-cycle area of the output voltage, or both the amplitude and half-cycle area are regulated against changes in the amplitude of the DC input voltage developed across terminals 23 and 24 and against changes in the loading on the various DC supply terminals including the ultor supply terminal U.

Inverter 20, in addition to output switching transistors Q1 and Q2, includes damper diodes 44 and 45, each paralleling a respective base-emitter current path of the output switching transistors, and a resistor 47 coupled in series with a feedback winding 22i of transformer 22 between the bases of transistors Q1 and Q2. When horizontal rate synchronizing control pulses are not being provided by pulse transformer 33, positive feedback from winding 22i produces a free-running operation of inverter 20 at a frequency of between 5 and 10 kilohertz, a frequency lower than the horizontal deflection frequency, as described in the aforementioned U.S. patent application Ser. No. 174,943 of D. W. Luz and D. H. Willis, herein incorporated by reference. A start-up resistor 58 is coupled between DC input terminal 23 and the base of output transistor Q1 to begin the switching action of the inverter when the television receiver is turned on.

To control the frequency of operation of inverter 20 at the horizontal deflection frequency, and to synchronize inverter operation with horizontal deflection, the control circuitry of the inverter includes turn-off control transistors 42 and 43 coupled respectively to the bases of output transistors Q1 and Q2, and saturable pulse transformer 33 having secondary windings 33b and 33c with first end terminals coupled respectively to the bases of turn-off control transistors 42 and 43 through respective resistors 48 and 49 and the other end terminals coupled to the emitters of transistors Q1 and Q2, respectively, through respective resistors 67 and 70. A filter capacitor 66 is coupled to the junction of winding 33b and resistor 67; a filter capacitor 69 is coupled to the junction of winding 33c and resistor 70.

Figure 2:
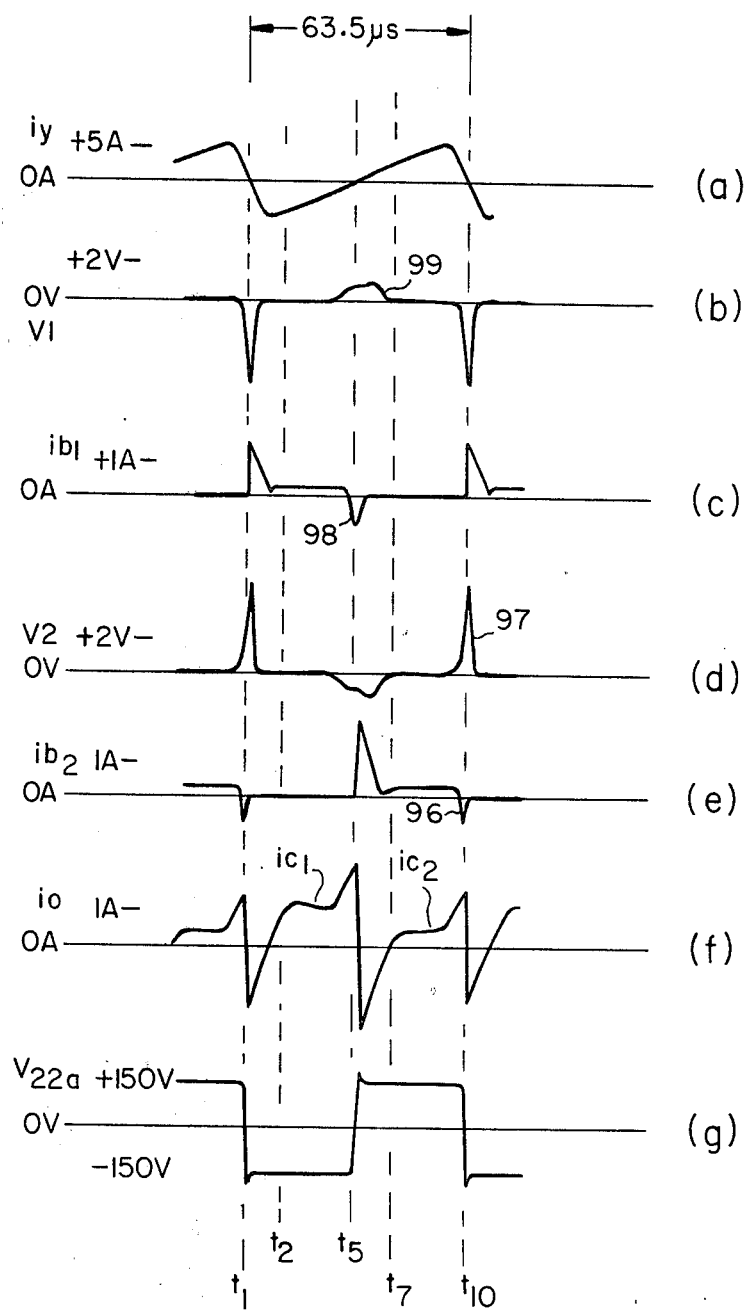
FIGS. 2-6 illustrate waveforms associated with the operation of the circuit of FIG. 1.

Consider operation of inverter 20 during a horizontal deflection cycle near the instant $t_2$ of the waveforms of FIG. 2. Output switching transistor Q1 is being supplied with a forward base current $i_{b1}$ as illustrated in FIG. 2c, and is in saturated conduction. With switching transistor Q1 conducting, the voltage $V_{22a}$ developed across primary winding section 22a of power transformer 22 is clamped to the DC input supply voltage Vin, of illustratively 150 volts magnitude, as illustrated in FIG. 2g. Input current $i_0$ flows from input terminal 23 to winding 22a and to transistor Q1 as a positive or forward collector current $i_{c1}$, as illustrated in FIG. 2f. The collector current $i_{c1}$ also flows in current sensing resistor 68.

The forward base current $i_{b1}$ for transistor Q1 is generated by the forward drive voltage being developed across power transformer feedback winding 22i, with the dotted terminal of the winding being positive. The current path begins, for example, at the dotted terminal of winding 22i through the base-emitter junction of transistor Q1, through resistor 68, damper diode 45, and resistor 47 to the undotted terminal of winding 22i.

To switch off transistor Q1 during synchronized inverter operation, a positive voltage pulse 99, illustrated in FIG. 2b, is developed across synchronizing pulse transformer secondary winding 33b near the zero-crossover instant $t_5$ of the deflection current $i_y$ of FIG. 2a, during the trace interval. Deflection current $i_y$ in primary winding 33a of pulse transformer 33 produces the magnetic saturation of magnetizable core 133 during the entire horizontal deflection cycle, except during those intervals that encompass the zero-crossover instants of the deflection current when the deflection current magnitude is sufficiently small to enable core 133 to come out of saturation. When core 133 comes out of saturation, voltage can be developed across pulse transformer windings 33a–33c due to the changing deflection current therein. Thus, as illustrated in FIG. 2b by the voltage V1 across pulse transformer secondary winding 33b, and as illustrated in FIG. 2d by the voltage V2 developed across pulse transformer secondary winding 33c, voltage pulses are produced only near the zero-crossover instant $t_5$ during trace and near the zero-crossover instants $t_1$ and $t_{10}$ during retrace.

When positive pulse 99 is developed near the trace zero-crossover instant $t_5$, turn-off control transistor 42 becomes conductive and begins to divert the current from feedback winding 22i away from the base of switching transistor Q1. Conduction of control transistor 42 also provides a path fo reverse base current that, in conjunction with the collector current of transistor Q1, sweeps out the stored charge in the base region of transistor Q1, as illustrated by the negative current pulse 98 in the base current waveform $i_{b1}$ of FIG. 2c. When the stored charge in the base region of transistor Q1 is depleted, the collector current $i_{c1}$ of the transistor goes to zero and the transistor switches off near zero-crossover instant $t_5$ of FIG. 2f.

When transistor Q1 switches off, the voltage across primary winding section $V_{22a}$, illustrated in FIG. 2g, and the voltage across primary winding section 22b, and across feedback winding 22i, reverse polarity. To maintain flux continuity in the core of power transformer 22, the reversed polarity voltage across winding 22b brings the voltage $V_{cQ2}$ at the collector of transistor Q2 to a slightly negative voltage, sufficient to forward bias damper diode 45 and produce reverse collector current in transistor Q2. Between times $t_5$ and $t_7$, a reverse collector current flows, as illustrated by the negative current portion of current $i_{c2}$ in FIG. 2f and by the large positive portion of the current $i_{b2}$ of FIG. 2e. After time $t_7$, when positive collector current flows, transistor Q2 conducts in the forward conduction mode with positive, forward biasing base current $i_{b2}$ being generated by the forward drive voltage being developed across power transformer feedback winding 22i, with the undotted terminal of winding 22i being positive relative to the dotted terminal.

Near the zero-crossover instant within retrace, near time $t_{10}$, core 133 of synchronizing pulse transformer 33 comes out of magnetic saturation to develop a positive voltage pulse 97 across secondary winding 33c as illustrated by the voltage V2 in FIG. 2d. Pulse 97 is applied to the base of turn-off control transistor 43, making the transistor conductive. Forward base current from power transformer feedback winding 22i is shunted away from the base of output switching transistor Q2 and the stored charge in the base region of Q2 is depleted as illustrated by the negative base current 96 of the base current waveform $i_{b2}$ of FIG. 2e. When the stored charge in the base region of transistor Q2 is swept out by the combined action of the negative base current and the flow of collector current in transistor Q2, the collector current in transistor Q2 falls to zero, switching off the transistor near time $t_{10}$, as illustrated in FIG. 2f. Voltage polarity reversals across the power transformer primary winding section 22b, the primary winding section 22a as illustrated in FIG. 2g, and the feedback winding 22i are produced.

The on-off switching of the conduction in the main collector-to-emitter paths of transistors Q1 and Q2 produces an alternating polarity voltage across each of the primary winding sections 22a and 22b of power transformer 22 that is substantially a rectangular wave voltage that has an amplitude during both polarity intervals that is substantially that of the direct current input voltage magnitude Vin developed at input terminal 23. Synchronizing signal pulse transformer 33 enables the polarity reversal instants of the primary winding section rectangular wave voltages to be produced near the zero-crossover instants of the scanning current waveform $i_y$ near times $t_1$, $t_5$ and $t_{10}$ of FIGS. 2a and 2g. By so synchronizing inverter switching, the rectangular wave voltage produced across each of the primary winding sections is nominally of a 50 percent duty cycle and synchronized to the deflection current waveform. Synchronization is needed to enable power transformer winding 22h, magnetically tightly coupled to primary winding sections 22a and 22b, to provide linearity correction to the scanning current $i_y$, as described in the aforementioned Luz et al. U.S. patent application.

Assuming for illustrative purposes an ideal waveform to the deflection current $i_y$ of FIG. 2a, the interval $t_1$–$t_5$ is the same duration as the interval $t_5$–$t_{10}$. Depending upon the exact moments that the forward collector currents $i_{c1}$ and $i_{c2}$ in output switching transistors Q1 and Q2 fall to zero value, relative to the corresponding zero-crossover instants of the deflection current $i_y$, the rectangular wave voltages produced across primary winding sections 22a and 22b may depart from the nominal 50 percent duty cycle.

Figure 3:
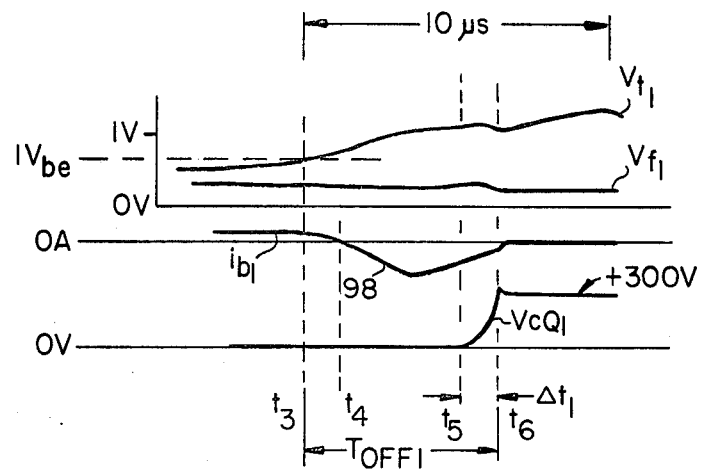
Figure 4:
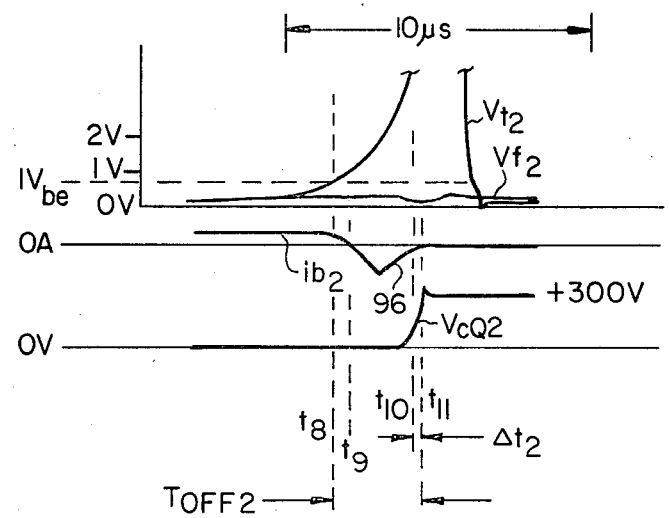

FIGS. 3 and 4 illustrate various waveforms near corresponding deflection current zero-crossover instants $t_5$ and $t_{10}$, respectively, on an expanded time scale compared to the time scale of the waveforms of FIG. 2.

Consider first the switching off of transistor Q1 near the zero-crossover instant $t_5$ within trace on the expanded time scale of FIG. 3. The voltage $V_{t1}$ developed at the dotted terminal of pulse transformer secondary winding 33b relative to earth ground is the voltage that is applied to the base of turn-off control transistor 42 through resistor 48 to produce the switching off of output transistor Q1. The voltage $V_{t1}$ includes, as a component, the voltage pulse 99 of the voltage V1 of FIG. 2b, produced by pulse transformer secondary winding 33b.

As illustrated in FIG. 3, when the voltage $V_{t1}$ exceeds the 1 $V_{be}$ level at the instant $t_3$, turn-off control transistor 42 becomes conductive and begins shunting forward base drive current away from switching transistor Q1 as illustrated by the waveform $i_{b1}$ of FIG. 3 after time $t_3$. The excess charge carriers in the base region of output transistor Q1 maintains the transistor in saturated conduction even after forward base drive has been removed, as illustrated by the substantially zero collector voltage $V_{cQ1}$ of FIG. 3 after time $t_3$. After time $t_4$ of FIG. 3, the reverse base current 98 begins to flow and aids the collector current in sweeping out stored base charge. Near time $t_6$ the excess base charge has been swept out and the base current as well as the collector current falls to zero value, switching off output transistor Q1. Thus, the switching off of transistor Q1 is delayed beyond the zero-crossover instant $t_5$ within trace by an amount $\Delta t_1 = t_6 - t_5$.

The amount of delay $\Delta t_1$ is a function of the exact instant $t_3$ that forward base drive for transistor Q1 is removed relative to the zero-crossover instant $t_5$. The delay $\Delta t_1$ is also a function of the turn-off time $T_{OFF1} = t_6 - t_3$ that it takes for the collector current in transistor Q1 to fall to zero after initiation of the removal of forward base drive. The turn-off time $T_{OFF1}$ of transistor Q1 depends greatly on the inherent storage time characteristics of the transistor device used as the switching transistor Q1, with a longer storage time device generally producing a longer turn-off time, other factors being unchanged.

Consider, now, operation of inverter 20 near the zero-crossover instant $t_{10}$ during retrace of the deflection current $i_y$ as illustrated by the waveforms of FIG. 4. To begin the switching off of output transistor Q2, the voltage $V_{t2}$ developed at the undotted terminal of pulse transformer winding 33c exceeds the 1 $V_{be}$ threshold at time $t_8$. Turn-off control transistor 43 becomes conductive, shunting forward base current away from transistor Q2. Near time $t_9$, the reverse base current 96 begins to flow and aids in sweeping out the stored charge in the base region of switching transistor Q2. Near time $t_{11}$ the excess stored charge carriers have been swept out, enabling the collector current of transistor Q2 to fall to zero, thereby switching off the transistor. Thus, the time for switching off transistor Q2 after the removal of forward drive to the transistor is the time $T_{OFF2} = t_{11} - t_8$.

The turn-off time $T_{OFF2}$ of transistor Q2 and $T_{OFF1}$ of transistor Q1 depend upon such parameters as the inherent storage time of the transistor devices used and will vary from manufactured unit to unit due to manufacturing tolerances. Comparing the turn-off times illustrated in FIGS. 3 and 4, one notes that the storage time of the transistor device of switching transistor Q1 is greater than the storage time of the transistor device of switching transistor Q2, resulting in $T_{OFF1}$ being greater than the turn-off time $T_{OFF2}$.

The exact switching off instant of switching transistor Q2, time $t_{11}$, is delayed by an amount $\Delta t_2$ from the zero-crossover instant $t_{10}$ of the deflection current $i_y$. Comparing the delay $\Delta t_1$ of FIG. 3 in turning off switching transistor Q1 to the delay $\Delta t_2$ in turning off switching transistor Q2 relative to their respective deflection current zero-crossover instants, one notes that transistor Q1 is delayed in turning off slightly longer than transistor Q2, resulting in transistor Q1 conducting longer each deflection cycle than transistor Q2.

This unequal conduction time of the two inverter switching transistors results in rectangular wave voltages across power transformer primary winding sections 22a and 22b that are different from the nominal 50 percent duty cycle. The unequal conduction time of the two switching devices also results in the collector currents in the two transistors being unequal, both in average and peak values, as illustrated in FIG. 2f, where transistor Q1 conducts longer than transistor Q2 but only by less than one microsecond.

The conduction of transistor Q1 clamps the voltage across primary winding section 22a to the input voltage magnitude Vin. However, because transistor Q1 conducts longer within each deflection cycle than does transistor Q2, the voltage developed across the inductive portion of the corresponding power transformer primary winding section 22a is less than the nominal magnitude Vin of the DC input voltage. The difference between the input voltage Vin and the voltage developed by the inductive portion of winding 22a is a voltage that is developed across the resistive portion of winding 22a by an increased flow of collector current in transistor Q1. With winding 22a typically having a relatively low resistance, even small variations in on-off switching of transistor Q1 from the nominal 50 percent duty cycle will produce a relatively large current component to the forward collector current $i_{c1}$.

Tolerances in the manufacture of the transistor devices of switching transistors Q1 and Q2 result in tolerances in the inherent storage time of the devices, producing variations from unit to unit in the turn-off times $T_{OFF1}$ and $T_{OFF2}$. Tolerances in the manufacture of pulse transformer 33 produce variations in the amplitude of the positive pulses 97 and 99, of FIGS. 2d and 2b, respectively, that are used to initiate inverter switching. Variations in the voltage pulses 97 and 99 produce variations in the instants $t_8$ and $t_3$ of FIGS. 4 and 3, respectively, at which the switching off of the output transistors is initiated. The various tolerances combine to produce variations in the delays $\Delta t_1$ and $\Delta t_2$ of the switching off corresponding zero-crossover instants of the deflection current $i_y$. Variations in the conduction of the output transistors may result in the conduction of one output transistor longer than the other by as much as one to two microseconds within a deflection cycle.

Figure 5:
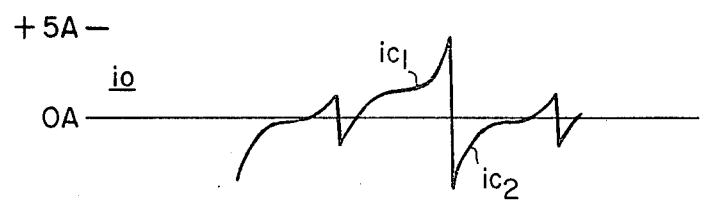

As illustrated in FIG. 5, when transistor Q1 conducts longer by two or more microseconds, the collector current $i_{c1}$ in the forward direction of transistor Q1 is substantially greater in amplitude than that of transistor Q2. The peak forward collector current of transistor Q1 may become so large as to either bring the transistor out of saturated conduction or begin to magnetically saturate the portion of the power transformer core around which the primary winding section 22a is wound. In either case, the voltages developed across primary winding sections 22a and 22b and feedback winding 22i will, through regenerative action, reverse in polarity to prematurely switch off transistor Q1 and switch on transistor Q2 in an unsynchronized manner.

Furthermore, the peak forward collector current for transistor Q2, as illustrated in FIG. 5, is relatively low in magnitude at the time turn-off of that transistor is initiated. Should the asymmetry in conduction of the two transistors become so substantial as to result in near zero forward collector current in transistor Q2 at the time forward base current to that device is removed, the switching off of transistor Q2 will not cause transistor Q1 to turn on since regenerative action to provide a polarity reversal across feedback winding 22i may not occur when transistor Q2 is switched off at zero collector current.

Figure 6:
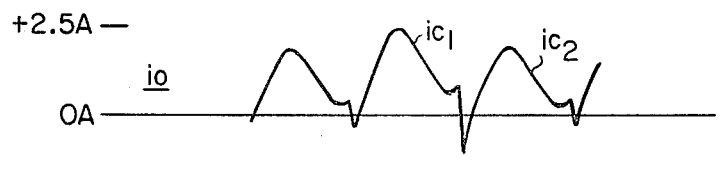

FIG. 6 illustrates the collector current $i_{c1}$ and $i_{c2}$ during non-fifty percent duty cycle switching under low input voltage levels combined at the same time with light loading on the DC supply terminals being supplied with power from transformer 22. In a ferroresonant power supply, such as the one illustrated in FIG. 1, a low voltage, light loading condition tends to introduce a drop to the forward collector current of the inverter switching transistors some time before the end of their respective conduction. With asymmetrical duty cycle operation, the shorter conduction of an output switching transistor, switching transistor Q2, illustratively, in the example of FIG. 6, results in collector current dropping to near zero at the end portion of the transistor's conduction. If the forward collector current is sufficiently small at the switching off instant, a polarity reversal in the voltage across feedback winding 22i may not occur, resulting in the failure of the other switching transistor to turn on, thereby disrupting normal inverter operation.

A feature of the invention is the design of an inverter circuit that takes into account tolerances in components, such as tolerances in storage time of the switching transistors and tolerances in the construction of synchronizing pulse transformer 33, to maintain the on-off switching of the inverter transistors near the nominal 50 percent duty cycle switching even when the tolerances are such as to tend to produce longer conduction in one of the transistors. As illustrated in FIG. 1, current sensing resistors 68 and 71 are coupled between earth ground and the respective emitter electrodes of switching transistors Q1 and Q2. Thus, the collector currents in the switching transistors also flow in the respective current sensing resistors. These voltages are representative of the collector current magnitudes.

The voltage across current sensing resistor 68 is filtered by an RC filter comprising resistor 67 and capacitor 66 to produce a substantially DC voltage $V_{f1}$, illustrated in FIG. 3, across capacitor 66 that is representative of the forward collector current in transistor Q1. The voltage developed across current sensing resistor 71 is filtered by an RC circuit comprising resistor 70 and capacitor 69 to develop a substantially DC voltage $V_{f2}$, illustrated in FIG. 4, representative of the collector current in transistor Q2. The current representative voltage $V_{f1}$ is added to the pulse voltage V1 to develop the turn-off voltage $V_{t1}$ that is applied to turn-off control transistor 42 to initiate the switching off of output transistor Q1. The current representative voltage $V_{f2}$ is added to the pulse voltage V2 to develop the turn-off voltage $V_{t2}$ that is applied to turn-off control transistor 43 to switch off switching transistor Q2.

By superimposing the voltages $V_{f1}$ and $V_{f2}$ on the pulse voltages V1 and V2, respectively, negative feedback is provided that opposes changes in the on-off switching of transistors Q1 and Q2 away from a 50 percent duty cycle. Consider the switching off of transistor Q1. If transistor Q1 due to tolerances or otherwise tends to conduct longer than transistor Q2, the collector current in transistor Q1 tends to increase as previously described. The current representative voltage $V_{f1}$ also increases. By inspection of FIG. 3, one notes that an increase in the voltage $V_{f1}$ produces an upward shift to the voltage waveform $V_{t1}$, resulting in $V_{t1}$ exceeding the 1 $V_{be}$ threshold level at an instant earlier than the instant $t_3$ illustrated in FIG. 3. The earlier initiation of the turn-off of transistor Q1 results in a delay smaller than the delay $\Delta t_1$ from the corresponding zero-crossover instant $t_5$ of the deflection current $i_y$, thereby shortening the conduction time of transistor Q1 relative to Q2, and bringing the on-off duty cycle of transistor Q1 back toward 50 percent.

A similar effect is produced should the other switching transistor, transistor Q2, conduct longer. However, because the voltage pulse 97 of FIG. 2d which controls the turning off of switching transistor Q2 is a relatively steeply sloped pulse, relatively large changes in current representative voltage $V_{f2}$ are required to produce substantial changes in the turn-off initiation instant $t_8$ of FIG. 4.

By superimposing a voltage that varies with collector current variations on the turn-off voltage V1 or V2 generated by synchronizing pulse transformer 33, a feedback mechanism is provided that adjusts the duty cycle on-off switching of the output transistors Q1 and Q2 so as to oppose changes in the amplitudes of their respective collector currents. Larger tolerances in inverter components may be accepted without incurring a significant risk of disrupting normal inverter circuit operation.

Figure 7:
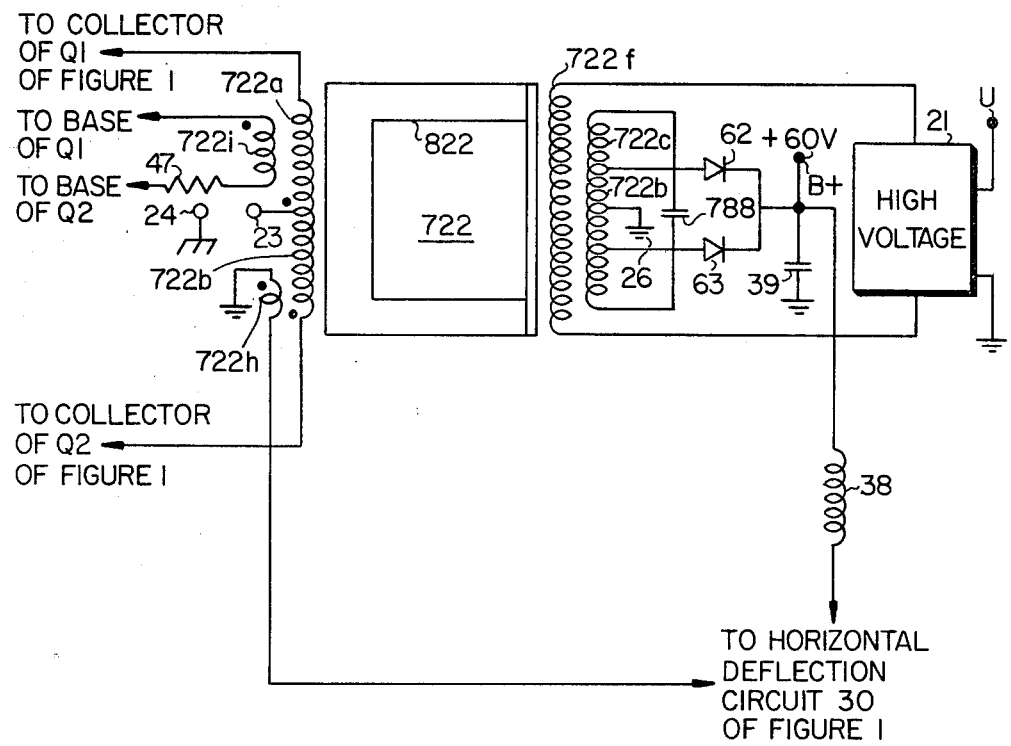
FIG. 7 illustrates a portion of the inverter power supply of FIG. 1 including a different embodiment of the inverter power transformer.

FIG. 7 illustrates a portion of the power supply of FIG. 1 wherein the ferroresonant load circuit 25 of FIG. 1 is omitted from the circuit of FIG. 7. Elements commonly identified in FIGS. 1 and 7 function in a similar manner. To regulate the various DC supply voltages, such as the B+ supply voltage and the ultor supply voltage of FIG. 7, the power transformer of the power supply, transformer 722 of FIG. 7, is constructed as a ferroresonant or self-regulating saturating core transformer. A capacitor 788 is coupled across secondary winding 722c to aid in the magnetic saturation of the secondary core portion of the ferroresonant transformer core 822. By ferroresonant action, the voltage across the tightly coupled secondary windings 722b, 722c and high voltage secondary winding 722f are regulated. Primary winding sections 722a and 722b are coupled to inverter transistors Q1 and Q2 and to the DC input terminal 23 in the same manner as the corresponding primary winding sections of the power transformer of FIG. 1. Winding 722i is the feedback winding that provides forward drive to the switching transistors Q1 and Q2 and winding 722h is the winding that is coupled to the synchronizing pulse transformer primary winding 33a of FIG. 1. Winding 722h is used to provide linearity correction to the deflection current, as previously mentioned. The construction of ferroresonant transformer 722 may be similar to that described in U.S. patent application Ser. No. 250,130, filed Apr. 2, 1981, by W. E. Babcock and F. S. Wendt, entitled "TELEVISION RECEIVER FERRORESONANT POWER SUPPLY USING A TWO-MATERIAL MAGNETIZABLE CORE ARRANGEMENT," herein incorporated by reference.

What is claimed is:

1. A television receiver, inverter power supply with duty-cycle control, comprising:
    a deflection winding;
    a deflection generator for developing scanning current in said deflection winding;
    a source of direct voltage;
    a power transformer including a primary winding and a supply winding;
    controllable switching means having a main current path coupled to said source and to said primary winding so that on-off switching of the conduction in said main current path develops an alternating polarity voltage across said primary winding, thereby developing a supply voltage across said supply winding;
    control means coupled to said switching means for producing said on-off switching at a nominal duty cycle of a predetermined percentage, including a synchronizing transformer with a first winding that has said deflection current flowing therein to magnetically saturate the core of said synchronizing transformer during the entirety of each deflection cycle except during intervals within each deflection cycle that encompass the zero-crossover instants of the deflection current to develop across a second winding of said synchronizing transformer switching signals for said controllable switching means so as to synchronize the zero-crossover instants of said power transformer alternating polarity voltage to corresponding zero-crossover instants of said deflection current;
    means for developing a control signal that differs with different duty-cycle percentages of said on-off switching; and
    means coupled to said control means and responsive to said control signal for adjusting the duty cycle of said on-off switching so as to oppose changes in said duty cycle away from the nominal percentage.

2. A television receiver, inverter power supply with duty-cycle control, comprising:
    a deflection winding;
    a deflection generator for developing scanning current in said deflection winding;
    a source of direct voltage;
    a power transformer including a primary winding and a supply winding;
    controllable switching means having a main current path coupled to said source and to said primary winding so that said on-off switching of the conduction in said main current path develops an alternating polarity voltage across said primary winding, thereby developing a supply voltage across said supply winding;
    control means coupled to said switching means for producing said on-off switching of the conduction in said main path, including a synchronizing transformer with a first winding that has said deflection current flowing therein to magnetically saturate the core of said synchronizing transformer during the entirety of each deflection cycle except during intervals within each deflection cycle that encompass the zero-crossover instants of the deflection current to develop across a second winding of said synchronizing transformer switching signals for said controllable switching means so as to synchronize the zero-crossover instants of said power transformer alternating polarity voltage to corresponding zero-crossover instants of said deflection current;
    means for developing a signal representative of the current in said main path; and
    means coupled to said control means and responsive to said main path current representative signal for adjusting the duty cycle of said on-off switching so as to oppose changes in the amplitude of the current in said main path.

3. A power supply according to claims 1 or 2 wherein the alternating polarity voltage developed across said primary winding is a substantially rectangular wave voltage having a magnitude during both polarity intervals that is substantially that of said direct voltage.

4. A power supply according to claims 1 or 2 wherein the alternating polarity voltage developed across said primary winding is a substantially rectangular wave voltage, the duty cycle of said rectangular wave voltage nominally being fifty percent.

5. A power supply according to claim 4 wherein said adjusting means opposes changes in the duty cycle of said rectangular wave voltage away from the nominal fifty percent duty cycle.

6. A power supply according to claim 5 wherein said switching means comprises first and second switching elements, each having a main current path, the main current paths of the two elements, the source of direct voltage and the transformer primary winding being coupled to one another so as to form a push-pull arrangement.

7. A power supply according to claim 6 wherein said power transformer comprises a self-regulating saturating core transformer for regulating said supply voltage.

8. A power supply according to claim 6 wherein said power transformer comprises a high leakage transformer with said supply winding being magnetically loosely coupled to said primary winding.

9. A power supply according to claim 8 including a ferroresonant saturable reactor circuit coupled to said power transformer supply winding for regulating said supply voltage by the ferroresonant operation of said ferroresonant saturable reactor circuit.

10. A power supply according to claim 6 wherein at least one of said switching elements has a control terminal that controls the on-off switching of the conduction in the main current path of said one element and wherein the switching on or the switching off of said one element produces the opposite type switching of the other element.

11. A power supply according to claim 10 wherein said power transformer includes a feedback winding coupled to the control terminal of said one element for switching on the conduction in the main current path of said one element when the conduction in the main current path of the other element is switched off.

12. A power supply according to claims 1 or 2 wherein said power transformer comprises a self-regulating saturating core transformer for regulating said supply voltage.

13. A power supply according to claims 1 or 2 wherein said power transformer comprises a high leakage transformer with said supply winding being magnetically loosely coupled to said primary winding.

14. A power supply according to claim 13 including a ferroresonant saturable reactor circuit coupled to said power transformer supply winding for regulating said supply voltage by the ferroresonant operation of said ferroresonant saturable reactor circuit.

15. A deflection synchronized switching power supply for a television display system, comprising:
a deflection winding;
a deflection generator coupled to said deflection winding for generating scanning current in said deflection winding during a deflection interval;
a power transformer having primary and supply windings;
a source of direct voltage coupled to said primary winding;
signal means coupled to said deflection generator for developing first and second control signals indicative of the occurrence of the zero-crossover instants of said scanning current within the trace and retrace intervals, respectively, of said deflection interval;
controllable switching means having first and second main current paths coupled to said power transformer;
control means coupled to said switching means and responsive to said first and second control signals for alternately switching said first and second main current paths into conduction near a respective one of said zero-crossover instants so as to develop an alternating polarity rectangular-wave voltage across said transformer primary winding for generating a supply voltage across said supply winding;
means for developing a control signal representative of the current in at least one of said first and second main current paths; and
means coupled to said control means and responsive to said control signal for adjusting the duty cycle of said rectangular wave voltage so as to oppose changes in the magnitude of the current in said one main current path.

16. A power supply according to claim 15 wherein said control means alternately switches said first and second main current paths so as to develop said rectangular wave voltage having a nominal fifty percent duty cycle and wherein said adjusting means opposes changes in said duty cycle away from the nominal fifty percent.

17. A power supply according to claim 16 wherein said first and second main current paths are coupled to the primary winding of said power transformer in a push-pull arrangement.

18. A power supply according to claim 16 wherein said signal means comprises a transformer having a first winding with said scanning current flowing therein and having at least one other winding for developing at least one of said first and second control signals thereacross.

* * * * *

UNITED STATES PATENT AND TRADEMARK OFFICE
CERTIFICATE OF CORRECTION

PATENT NO. : 4,377,776

DATED : March 22, 1983

INVENTOR(S) : David Warren Luz

It is certified that error appears in the above-identified patent and that said Letters Patent is hereby corrected as shown below:

Column 6, Line 12

That portion reading "fo" should read -- for --

Column 9, Line 5

That portion reading "amplitude" should read
  -- amplitudes --

Column 9, Line 12

That portion reading "off" should continue
  -- instants of the output transistors $Q_1$ and $Q_2$
    from the --

Signed and Sealed this

Second Day of August 1983

[SEAL]

Attest:

GERALD J. MOSSINGHOFF

Attesting Officer    Commissioner of Patents and Trademarks